(12) United States Patent
Minkus

(10) Patent No.: US 10,968,833 B2
(45) Date of Patent: Apr. 6, 2021

(54) ACCESSORY GEARBOX FOR A GAS TURBINE ENGINE

(71) Applicant: ROLLS-ROYCE DEUTSCHLAND LTD & CO KG, Dahlewitz (DE)

(72) Inventor: Uwe Minkus, Frankfurt (DE)

(73) Assignee: ROLLS-ROYCE DEUTSCHLAND LTD & CO KG, Dahlewitz (DE)

(*) Notice: Subject to any disclaimer, the term of this patent is extended or adjusted under 35 U.S.C. 154(b) by 0 days.

(21) Appl. No.: 15/722,421

(22) Filed: Oct. 2, 2017

(65) Prior Publication Data

US 2018/0094717 A1 Apr. 5, 2018

(30) Foreign Application Priority Data

Oct. 3, 2016 (GB) ..................................... 1616759

(51) Int. Cl.
| | | |
|---|---|---|
| *F02C 7/32* | (2006.01) | |
| *F02K 3/06* | (2006.01) | |
| *F02C 7/20* | (2006.01) | |
| *B64D 27/26* | (2006.01) | |
| *B64D 29/00* | (2006.01) | |
| *F02C 7/36* | (2006.01) | |

(52) U.S. Cl.
CPC ............... *F02C 7/32* (2013.01); *F02K 3/06* (2013.01); *B64D 27/26* (2013.01); *B64D 29/00* (2013.01); *B64D 2027/262* (2013.01); *F02C 7/20* (2013.01); *F02C 7/36* (2013.01); *F05D 2220/323* (2013.01); *F05D 2240/90* (2013.01); *F05D 2240/91* (2013.01); *F05D 2250/31* (2013.01); *F05D 2250/311* (2013.01)

(58) Field of Classification Search
CPC ...... F02C 7/32; F02C 7/20; F02C 7/36; F05D 2240/90; B64D 27/26; B64D 2027/262; B64D 29/00; B64D 29/06
See application file for complete search history.

(56) References Cited

U.S. PATENT DOCUMENTS

| | | | | |
|---|---|---|---|---|
| 2004/0238687 | A1* | 12/2004 | Jones ..................... | B64D 29/08 244/62 |
| 2006/0101804 | A1* | 5/2006 | Stretton .................... | F02C 7/32 60/226.1 |
| 2006/0137355 | A1* | 6/2006 | Welch .................. | B64D 41/007 60/772 |
| 2009/0000308 | A1* | 1/2009 | Cloft ........................ | F02C 7/32 60/802 |
| 2012/0107104 | A1* | 5/2012 | Suciu ....................... | F02C 7/14 415/177 |

(Continued)

FOREIGN PATENT DOCUMENTS

| EP | 2011979 A2 | 1/2009 |
|---|---|---|
| EP | 3054128 A1 | 8/2016 |

OTHER PUBLICATIONS

Feb. 2, 2018 Search Report issued in European Patent Application No. 17194297.

(Continued)

*Primary Examiner* — Thomas P Burke
(74) *Attorney, Agent, or Firm* — Oliff PLC

(57) ABSTRACT

A gas turbine engine arrangement includes an accessory gearbox which is mounted so as to be aligned in an axial direction along the engine. The accessory gearbox may be recessed at least partly into a casing of the engine.

2 Claims, 2 Drawing Sheets

(56) References Cited

U.S. PATENT DOCUMENTS

| | | | |
|---|---|---|---|
| 2012/0117981 A1 | 5/2012 | Suciu et al. | |
| 2014/0026700 A1* | 1/2014 | Beier | F01D 15/10 |
| | | | 74/405 |
| 2014/0090386 A1* | 4/2014 | Cloft | F02C 7/32 |
| | | | 60/772 |
| 2016/0040601 A1* | 2/2016 | Frost | F02C 7/32 |
| | | | 415/122.1 |

OTHER PUBLICATIONS

Mar. 20, 2017 Search Report issued in Great Britain Patent Application No. 1616759.5.

* cited by examiner

ACCESSORY GEARBOX FOR A GAS TURBINE ENGINE

The present disclosure concerns accessory gearboxes for gas turbine engines, and in particular arrangements for mounting such gearboxes.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. The engine 10 is surrounded by a casing 20; typically the casing 20 comprises a fan casing 40, an intermediate casing (IMC) or intermediate compressor casing (ICC) 42 and a bypass casing 44. The casings 40, 42 and 44 are coaxial and are typically joined axially to one another by flanges (not shown) to form the casing 20. The outer contours of the fan casing 40, IMC or ICC 42 and bypass casing 44 together define an engine outer casing line. The fan casing 40 defines the air intake 12; the bypass casing defines a bypass duct 21.

The gas turbine engine 10 works in the conventional manner so that air entering the intake 12 is accelerated by the fan 13 to produce two air flows: a first air flow into the high-pressure compressor 14 and a second air flow which passes through the bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13 by suitable interconnecting shafts 22, 23.

The high-pressure compressor 14, combustion equipment 15 and high-pressure turbine 16 together constitute the core engine.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan.

Accessory units provide power for aircraft hydraulic, pneumatic and electrical systems, in addition to providing various pumps and control systems for efficient engine operation. The drive for the accessory units is typically taken from one of the engine rotating shafts 22, 23, via an internal gearbox (not shown in FIG. 1) to an external—or accessory—gearbox (not shown) which is typically mounted on the outside of the fan casing or intermediate casing (IMC) or intermediate compressor casing (ICC). The accessory gearbox provides a mounting for the accessory units and distributes an appropriate geared drive to each accessory unit. Other components may also be mounted on the engine casings and may protrude radially outward beyond the engine outer casing line. The dressed engine (i.e. the engine together with the accessory gearbox, accessory units and any other components mounted on the engine casings) is surrounded by a nacelle (not shown in FIG. 1) which protects the components and defines a nacelle outer contour which provides an aerodynamically smooth outer surface for the power plant. Conventionally, the accessory gearbox extends circumferentially around the fan casing or IMC, and the individual accessory units are mounted to it so that they extend mostly axially. Typically the accessory gearbox will extend about one-quarter to one-third of the way around the circumference of the engine.

Due to the size of the accessory gearbox and the size of the accessories it drives, the accessory gearbox defines the nacelle outer contour. Because the nacelle outer contour in turn defines the aerodynamic shape of the nacelle, also known as the loft lines, it also in effect defines the overall length of the nacelle—the larger the nacelle outer contour, the longer must be the nacelle. The size of the accessory gearbox and its protrusion radially outward from the dressed engine therefore increase both the nacelle outer contour and the nacelle length, with an inevitable increase in the weight of the nacelle and in its drag in operation.

It would be desirable to have a means of mounting the accessory gearbox that would permit a shorter and smaller contour (diameter) nacelle.

According to a first aspect there is provided a gas turbine engine arrangement, the engine comprising an accessory gearbox, the arrangement characterised in that the accessory gearbox is aligned in an axial direction along the engine.

The accessory gearbox may be mounted on a casing of the engine, and the accessory gearbox may be recessed at least partly into the casing.

The casing may comprise a recess to accommodate the accessory gearbox.

The recess may cause a reduction in the bypass duct cross-sectional area in the region of the recess.

The inner wall of the bypass duct may comprise a corresponding recess to mitigate the reduction in cross-sectional area.

The axial alignment of the accessory gearbox may permit a reduction in the outer casing line of the nacelle and therefore a reduction in the overall length of the nacelle.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
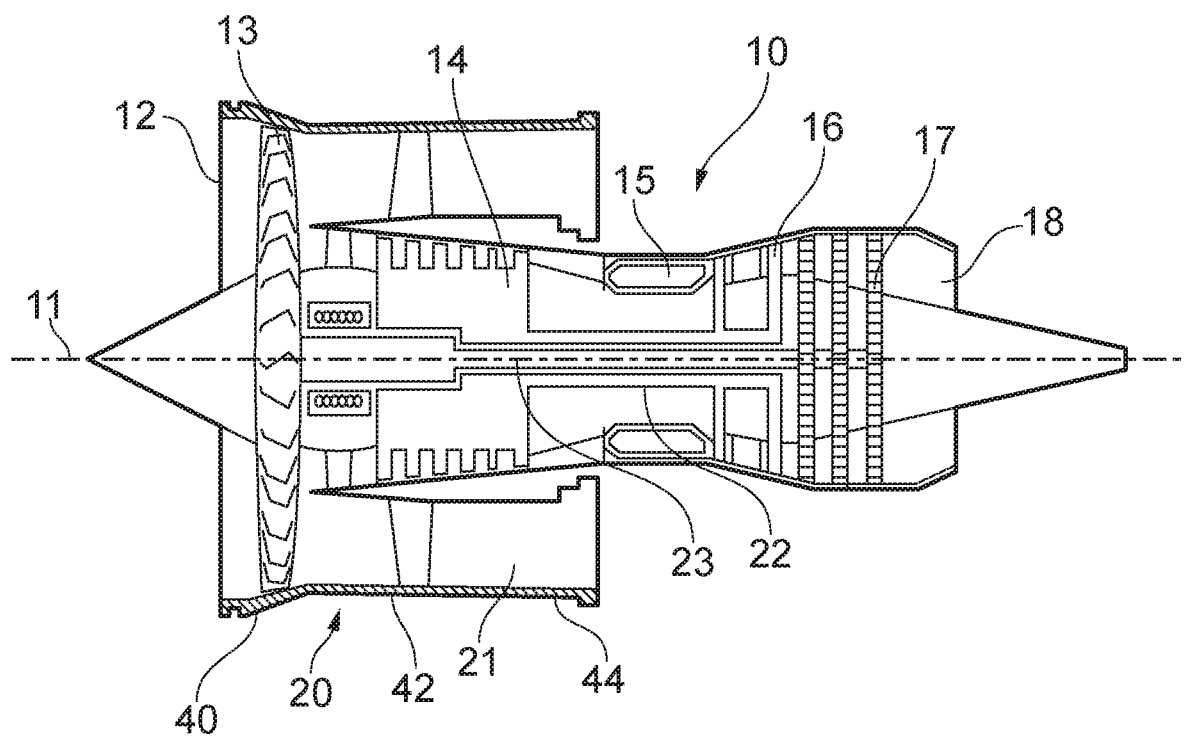
FIG. 1 is a sectional side view of a gas turbine engine, as already described.
Figure 2A:
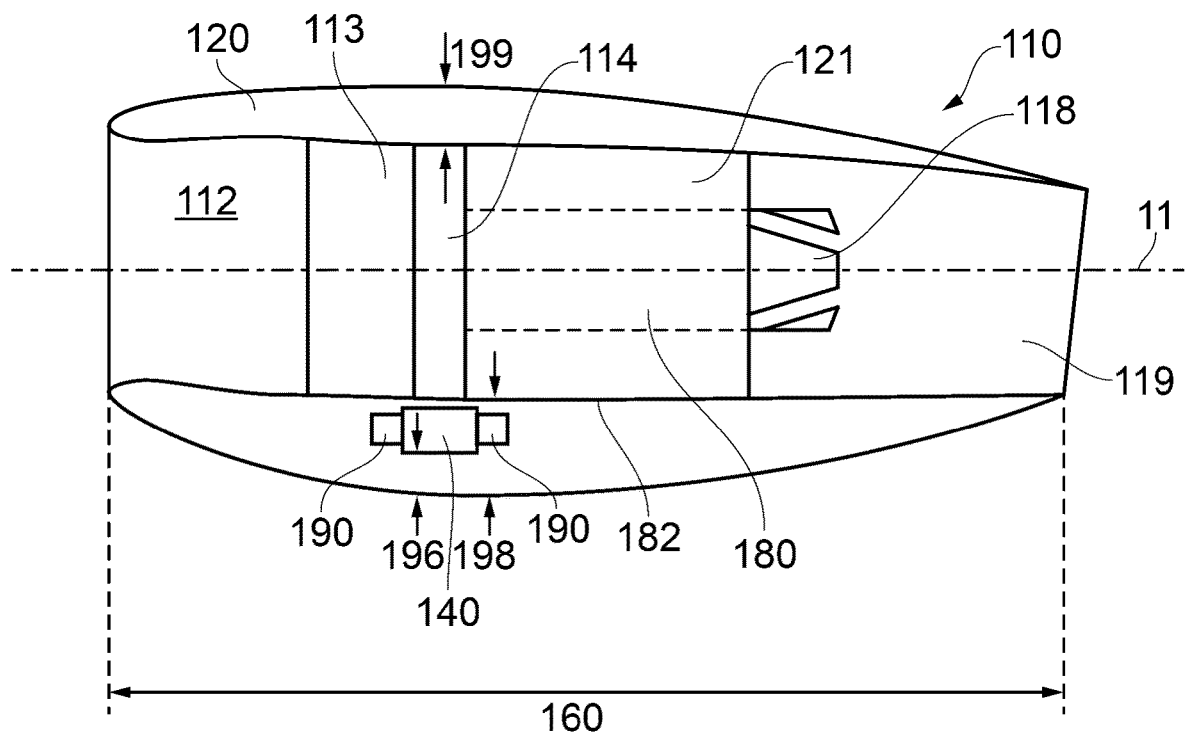
FIG. 2(a) is a schematic sectional side view of a gas turbine engine, showing the nacelle cross-section with a conventional accessory gearbox.

FIG. 2(a) shows a gas turbine engine 110 comprising a nacelle air intake 112, a fan casing 113, an IMC 114, and a core engine 180 mounted within a bypass casing 182. (For other engine architectures, an ICC may take the place of the IMC 114.) The core engine 180 and the bypass casing 182 together define an annular bypass duct 121. As in the engine shown in FIG. 1, air entering the nacelle air intake 112 is accelerated by a fan (not shown in FIG. 2(a)) to produce two air flows: a first air flow into the core engine 180 and a second air flow which passes through the bypass duct 121 to provide propulsive thrust. The core engine air flow is exhausted through a nozzle 118; the bypass air flow is exhausted through a bypass nozzle 119 defined by a nacelle 120.

Mounted to the IMC 114 is an accessory gearbox 140, on which are mounted a number of accessories 190 (only two shown). The accessories 190 may be of any known type (for example starter, hydraulic pump, heat exchanger, breather, oil pump, drains tank, hydro-mechanical unit (HMU), fuel pump, alternator).

The nacelle outer contour (i.e. the profile of the outer skin of the nacelle 120 around and along the whole engine) is constrained by the need to maintain a minimum clearance 196 between the dressed engine and the nacelle outer skin. Because the accessory gearbox 140 protrudes from the lower part of the IMC and because there is no corresponding protrusion from the upper part of the IMC, the lower part of the nacelle extends further away 198 from the bypass duct casing 182 than does the upper part 199, so that the outer contour of the nacelle 120 is non-circular. The nacelle outer contour along the lower part of the engine therefore constrains the loft lines and thereby the overall length 160 of the nacelle, which is greater than if it were constrained by the nacelle outer contour along the upper part of the engine.

Figure 2B:
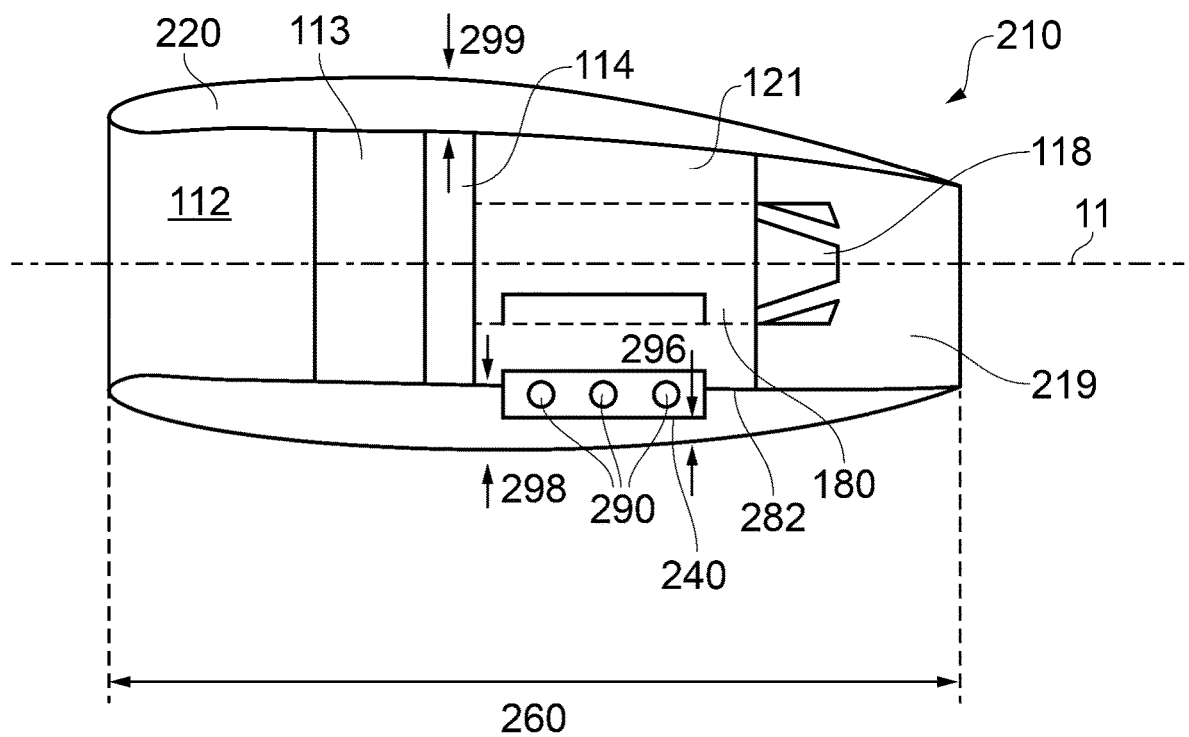
FIG. 2(b) is a schematic sectional side view of a gas turbine engine, showing the nacelle cross-section with an axially-aligned accessory gearbox.

FIG. 2(*b*) shows a gas turbine engine 210. Like the engine of FIG. 2(*a*), the gas turbine engine 210 comprises a nacelle air intake 112, a fan casing 113, an IMC 114, and a core engine 180 mounted within a bypass casing 282. The core engine 180 and the bypass casing 282 together define an annular bypass duct 121. As in the engine shown in FIG. 1, air entering the nacelle intake 112 is accelerated by a fan to produce two air flows: a first air flow into the core engine 180 and a second air flow which passes through the bypass duct 121 to provide propulsive thrust. The core engine air flow is exhausted through a nozzle 118; the bypass air flow is exhausted through a bypass nozzle 219 defined by a nacelle 220.

Mounted to the bypass casing 282 is an axially-aligned accessory gearbox 240, on which are mounted a number of accessories 290 (only three shown). The accessories 290 may be of any known type, as described above.

In the arrangement of FIG. 2(*b*), the bypass casing 282 comprises a recess configured to accommodate the accessory gearbox 240, so that the accessory gearbox 240 is partially inset into the bypass casing 282 and protrudes less far in a radial direction than if the recess were not present.

The radially inward contouring of the bypass casing 282 to accommodate the accessory gearbox 240 results in a corresponding contouring on the inner wall of the bypass casing 282, which locally reduces the cross-sectional area of the bypass duct 121. This inevitably increases the bypass losses, but because the bypass flow velocity is lower than the flow velocity outside the nacelle, a geometrically identical blockage will cause less loss in the bypass and hence result in an overall reduced loss (at engine/power plant level).

The increased bypass losses can be mitigated by a corresponding radially inward contouring of the bypass duct 121 inner wall (formed by, for example, the fairings of the core engine 180 or inner fixed structure (not shown in FIG. 2(*b*)) so that there is no or less local reduction in the bypass duct 121 cross-sectional area. The benefit of the axially mounted accessory gearbox can thus be maximised.

As in the engine shown in FIG. 2(*a*), it is necessary to maintain a minimum clearance 296 between the dressed engine and the nacelle outer skin. The axially-extending accessory gearbox 240 protrudes less far from the bypass casing 282 than does the conventional accessory gearbox 140 in the arrangement of FIG. 2(*a*). Therefore, the lower part of the nacelle 220 extends less far 298 from the bypass casing 282 than in the arrangement of FIG. 2(*b*). The upper dimension 299 is the same as the corresponding dimension 199 in FIG. 2(*a*) so the outer casing line of the nacelle 220 is smaller than the outer casing line of the nacelle 120, as illustrated by a comparison between FIG. 2(*a*) and FIG. 2(*b*).

Because the outer casing line of the nacelle 220 is smaller than the outer casing line of the nacelle 120, the overall length 260 of the nacelle 220 can be made shorter than the overall length 160 of the nacelle 120 without introducing aerodynamically unacceptable curvatures. The reduced length and reduced outer casing line of the nacelle 220 deliver a significant reduction in weight compared with the conventional nacelle 120, and the reduced outer casing line also delivers an aerodynamic benefit.

In an alternative arrangement, the bypass casing 282 may comprise no recess, so that the accessory gearbox 240 is simply mounted on the bypass casing 282. This will cause the accessory gearbox 240 to protrude further in a radial direction than in the arrangement of FIG. 2(*b*), and therefore the outer casing line will be larger than for the arrangement of FIG. 2(*b*).

It will be understood that the invention is not limited to the embodiments described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine comprising:
   a bypass casing defining an outer wall of a bypass duct of the gas turbine engine, the bypass casing including a first recess formed in the outer wall of the bypass duct, the first recess reducing a cross-sectional area of the bypass duct in a region of the first recess, an inner wall of the bypass duct including a corresponding second recess configured to mitigate a reduction in the cross-sectional area of the bypass duct; and
   an accessory gearbox aligned in an axial direction of the gas turbine engine, the accessory gearbox including a lower portion and an upper portion, wherein the lower portion of the accessory gearbox is at least partially disposed in the first recess formed in the outer wall of the bypass duct, and wherein the upper portion of the accessory gearbox partially protrudes from the first recess into the bypass duct in a radial direction of the gas turbine engine such that the accessory gearbox is in fluid communication with an airflow through the bypass duct.

2. The gas turbine engine of claim 1, wherein an alignment of the accessory gearbox in the axial direction reduces an outer casing line of a nacelle of the gas turbine engine and reduces an overall length of the nacelle.

* * * * *